United States Patent

Hartenstine

[11] Patent Number: 6,022,042
[45] Date of Patent: Feb. 8, 2000

[54] STROLLER HAVING A BRAKE ASSEMBLY

[75] Inventor: Curtis M. Hartenstine, Birdsboro, Pa.

[73] Assignee: Graco Children's Product Inc., Elverson, Pa.

[21] Appl. No.: 08/912,233

[22] Filed: Aug. 15, 1997

[51] Int. Cl.[7] .................................................. B62B 5/04
[52] U.S. Cl. ........................ 280/642; 188/20; 188/31; 280/47.38; 280/650
[58] Field of Search ........................ 280/642, 47.38, 280/650, 647, 648, 33.994, 649; 188/20, 31

[56] References Cited

U.S. PATENT DOCUMENTS

| | | | |
|---|---|---|---|
| 352,689 | 11/1886 | Haus | 188/20 |
| 1,066,034 | 7/1913 | Nauts | 280/650 |
| 4,116,464 | 9/1978 | Haley | 280/647 |
| 4,567,964 | 2/1986 | Kassai | 188/20 |
| 4,618,033 | 10/1986 | Kassai | 188/20 |
| 4,953,667 | 9/1990 | Bigo | 188/31 |
| 5,046,748 | 9/1991 | Oat-Judge | 280/47.34 |
| 5,370,408 | 12/1994 | Eagan | 280/33.994 |
| 5,460,399 | 10/1995 | Baechler et al. | 280/650 |
| 5,478,102 | 12/1995 | Haung | 280/642 |
| 5,765,665 | 7/1996 | Cheng et al. | 188/20 |

FOREIGN PATENT DOCUMENTS

| | | | |
|---|---|---|---|
| 4226090 | 2/1994 | Germany | 188/20 |
| 230944 | 9/1994 | Japan . | |
| 230946 | 9/1994 | Japan . | |
| 269272 | 1/1996 | Japan . | |
| 400315 | 10/1933 | United Kingdom | 188/20 |

Primary Examiner—J. J. Swann
Assistant Examiner—James S. McClellan
Attorney, Agent, or Firm—Foley & Lardner

[57] ABSTRACT

A stroller has a frame, a plurality of wheels, and brake assembly. The brake assembly includes a mounting member fixedly disposed on the frame, the mounting member having cam surface with a first cam portion and a second cam portion; a brake member disposed on the mounting member movable between a locked position and an unlocked position; a cam follower disposed in the brake member in pressure contact with the cam surface to bias type brake member toward the locked position when the cam follower contacts the first cam portion and to bias the brake member toward the unlocked position when the cam follower contacts the second cam portion; and a brake surface operatively connected to the wheel, the brake member engaging the brake surface when the brake member is in the locked position.

25 Claims, 17 Drawing Sheets

STROLLER HAVING A BRAKE ASSEMBLY

BACKGROUND OF THE INVENTION

1. Field of the Invention

The present invention relates to a stroller, and more particularly to an improved brake assembly for a stroller.

2. Discussion of the Related Art

Strollers have been available for many years to provide convenient transportation for children. Typically, these strollers include various brake mechanisms to maintain them in a stopped position, and when desired, to be released.

Some conventional designs include a spring biased brake which frictionally engages the surface of the stroller wheel. However, the limited resistance provided by friction prevents a positive engagement of the wheel.

Other conventional designs include a cog wheel having extensions and gaps, an engagement projection which is received into the gaps for engaging the extensions to lock the wheel in place, and an operating member to actuate the engagement projection. However, the operation member of such designs must be engaged by the user rather than by spring action, to properly position the engagement projection into a gap. Here, when the brake is actuated, the cog wheel often must rotate slightly until the engagement projection falls into a gap. Further, some conventional designs provide brakes on both right and left sides of the stroller which are connected by a single operating member, thereby rigidly coupling the right and left brakes. However, in such designs, if one engagement projection is positioned over an extension of the cog wheel and the second engagement projection is positioned over a gap, neither engagement members can fall into the gaps due to the rigid coupling of both brakes. That is, the first engagement projection is held out of the gap by the second engagement projection which rests on the extension. Moreover, as the wheel is rotated, the arrangement becomes reversed with the first engagement projection positioned at a gap and the second engagement member positioned at a extension. Accordingly, the brake "skips" and fails to engage until the wheels are rotated so that the extensions and gaps of the two wheels become synchronized. This synchronization requires some movement of the stroller and more particularly some relative movement between left and right cog wheels.

SUMMARY OF THE INVENTION

Accordingly, the present invention is directed to a stroller that substantially obviates one or more of the problems due to limitations and disadvantages of the related art.

An object of the present invention is to provide a brake assembly which engages the wheels securely and reliably.

Another object of the present invention is to provide a brake assembly which can be ergonomically engaged and disengaged.

Another object of the present invention is to provide a stroller with a brake assembly which can be easily manufactured and assembled at low cost.

Another object of the present invention is to provide a stroller with a brake assembly having complementary brakes with one actuation member yet providing decoupled action.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a stroller having a frame and a plurality of wheels comprises a mounting member fixedly disposed on the frame, the mounting member having cam surface with a first cam portion and a second cam portion; a brake member disposed on the mounting member movable between a locked position and an unlocked position; a cam follower disposed in the brake member in pressure contact with the cam surface to bias the brake member toward the locked position when the cam follower contacts the first cam portion and to bias the brake member toward the unlocked position when the cam follower contacts the second cam portion; and a brake surface operatively connected to the wheel, the brake member engaging the brake surface when the brake member is in the locked position.

In another aspect, a stroller having a frame, a first wheel and a second wheel comprises a first brake member mounted on the frame, the first brake member movable between a locked position and an unlocked position; a second brake member mounted on the frame, the second brake member movable between a locked position and an unlocked position; a first cog wheel operatively connected to the first wheel; a second cog wheel operatively connected to the second wheel; a first projection disposed on the first brake member to engage the first cog wheel when the first brake mechanism is disposed in the locked position; a second projection disposed on the second brake mechanism to engage the second cog wheel when the second brake mechanism is disposed in the locked position; and an actuation lever which provides simultaneous actuation of the first and second brake members, the first and second brake members remaining decoupled to allow the engagement of one of the first and second brake members without the engagement of the other of the first and second brake members.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
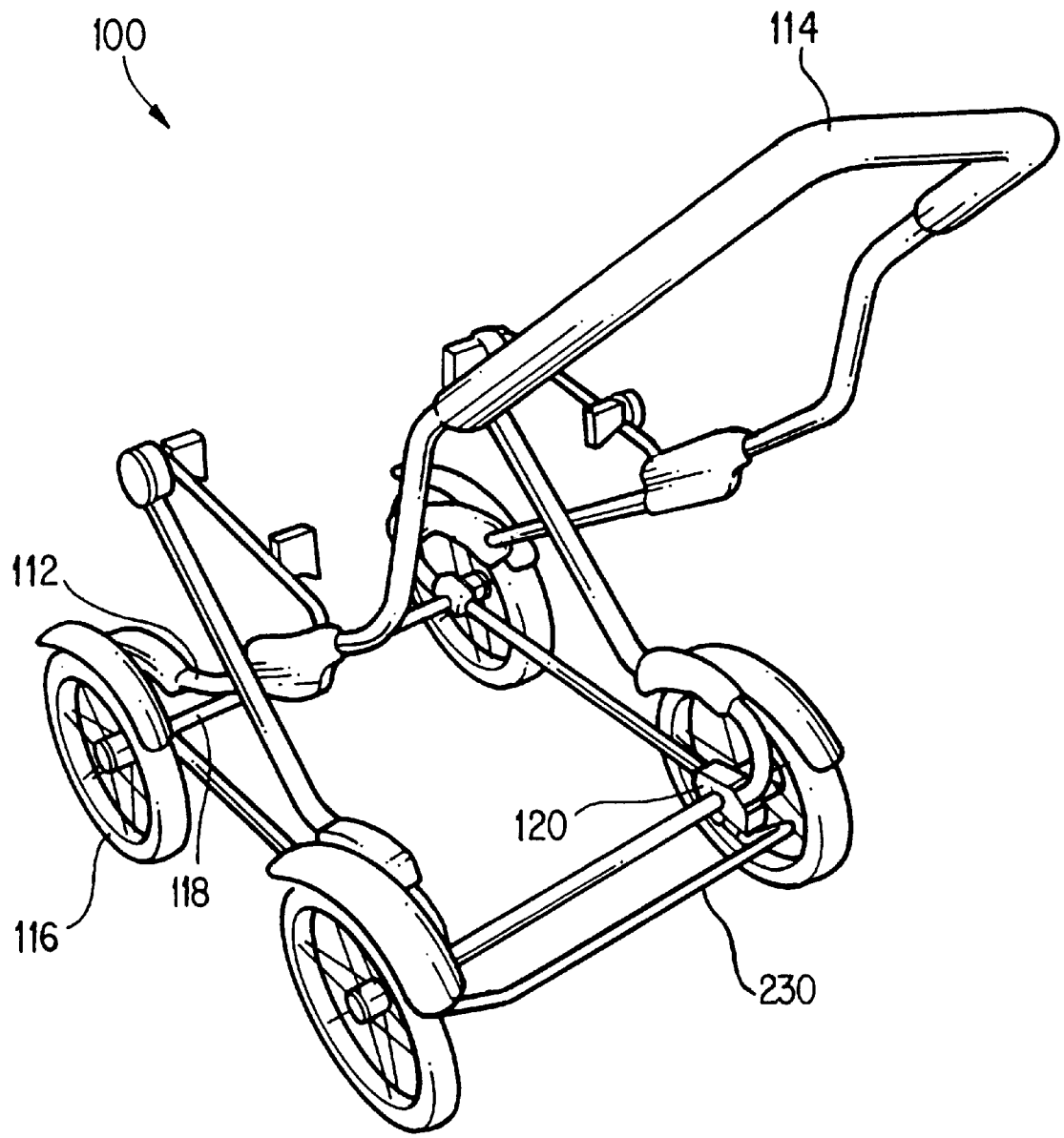
FIG. 1 is a perspective view of a stroller in accordance with the present invention.

FIG. 1 shows a stroller 100 in accordance with the present invention. The stroller 100 includes a bassinet (not shown) supported by a frame 112 to be pushed using handle 114. The frame includes wheels 116 mounted on axles 118. According to a preferred embodiment, a brake assembly is actuated using an actuation lever 230. The brake assembly may include symmetric right and left brakes 120 for the corresponding right and left rear wheels 116 of the stroller 100. In this case, the actuation lever 230 preferably actuates both brakes 120.

Figure 2:
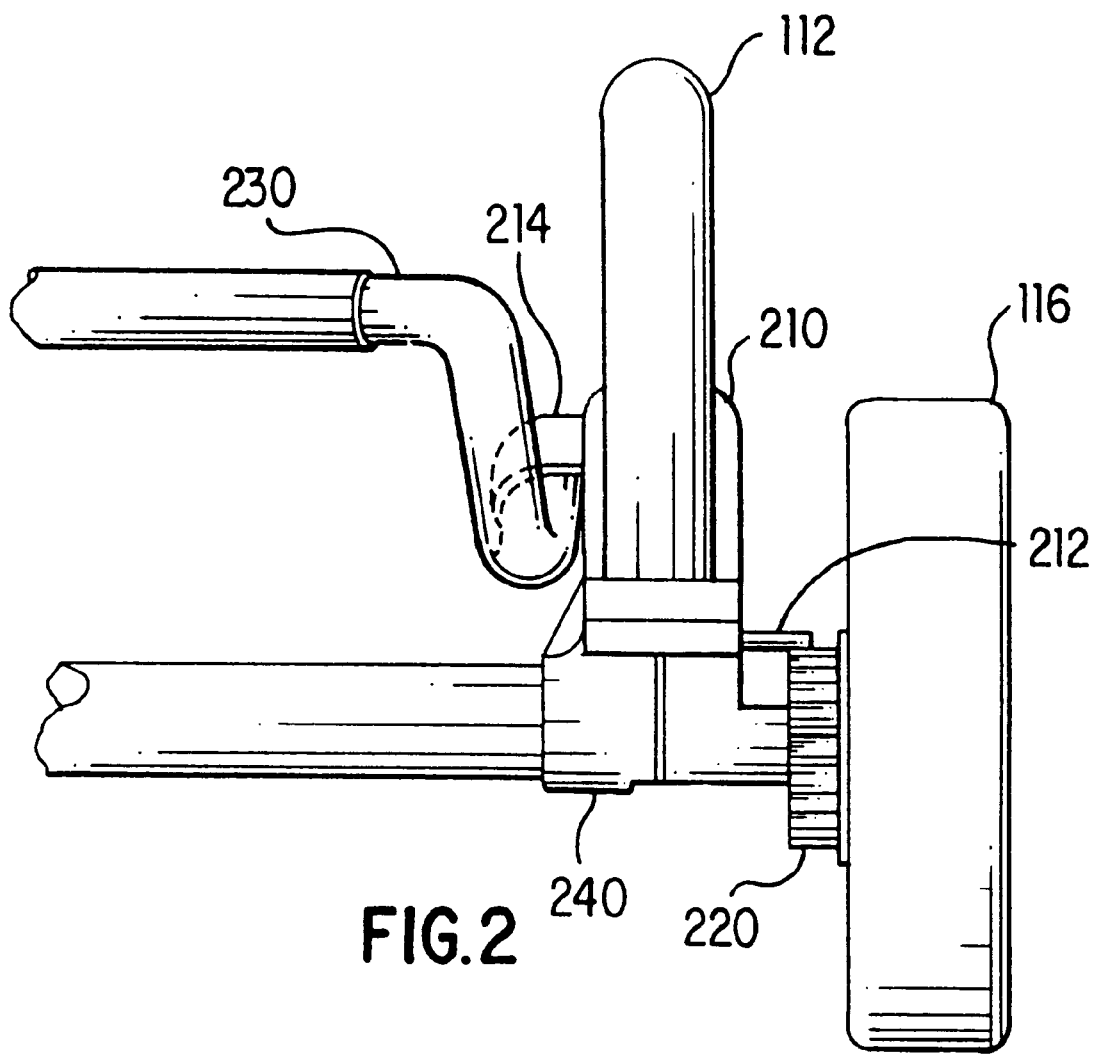
FIG. 2 is a rear view of a right side of a brake assembly in accordance with the present invention.
Figure 3:
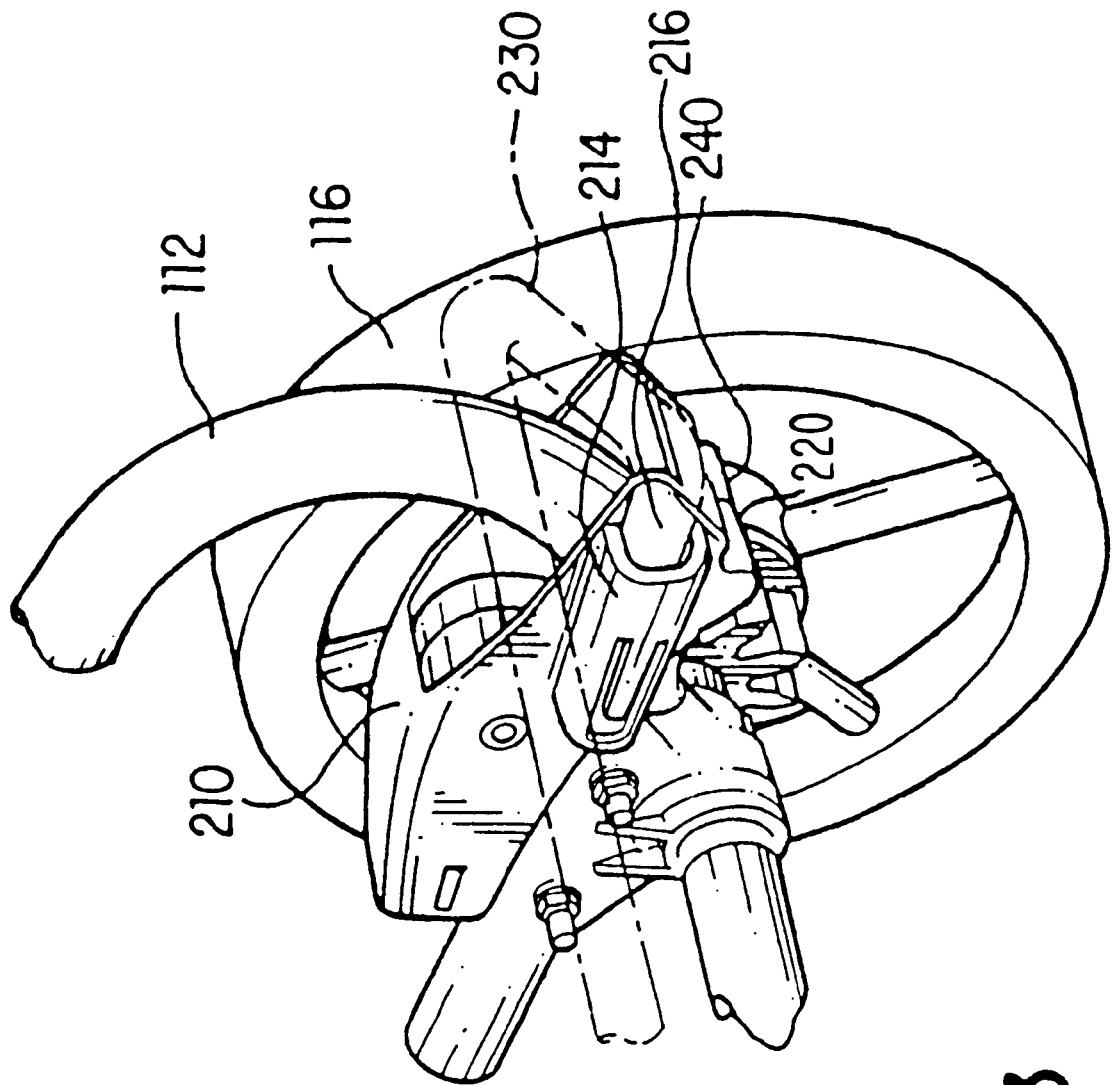
FIG. 3 is a perspective view of the brake assembly of FIG. 2.

FIGS. 2 and 3 show a preferred brake assembly in accordance with the present invention. Specifically, FIG. 2 shows a preferred rear view of the right side of the brake assembly, and FIG. 3 shows a perspective view of the right side of the brake assembly.

Generally, the preferred brake assembly comprises a brake member 210, a braking surface 220, and the actuation lever 230. Preferably, the brake member 210 is disposed on the frame 112, and the braking surface 220 is operatively connected to the wheel 116 of the stroller. The brake member 210 may be pivotally mounted to a mounting member 240. The mounting member 240 may be fixed to the frame using bolts, rivets, or the like. The braking surface 220 may also be integrally formed with the wheel 116 in a molding process. Alternatively, the braking surface may be a separate component fixed to the wheel by an appropriate tab connector or other technique. The braking surface 220 is preferably disposed to engage with the brake member 210 to lock the wheel 116. In a most preferable embodiment, the braking surface 220 is a cog wheel. The actuation lever 230 may be configured as a U-shaped bar with ends attached to the right and left brakes 120.

The brake member 210 is movable between a downward locked position and an upward unlocked position. In the locked position, the brake member 210 engages the cog wheel 220 to lock the position of the wheel. For example, the brake member 210 may include a projection 212 which engages the cog wheel 220.

The actuation lever 230 is attached to the brake member 210 so that the user may easily actuate the brake member 210 between the locked position and the unlocked position. In the preferred embodiment, the brake member 210 includes a lever receiving portion 214 having a cavity 216 for receiving the actuation lever 230.

Figure 4:
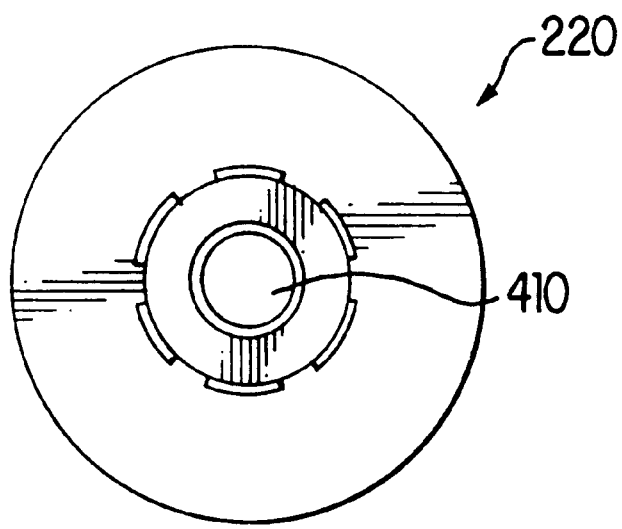
FIGS. 4 and 5 are side views of a cog wheel for the brake assembly of FIG. 2.
Figure 5:
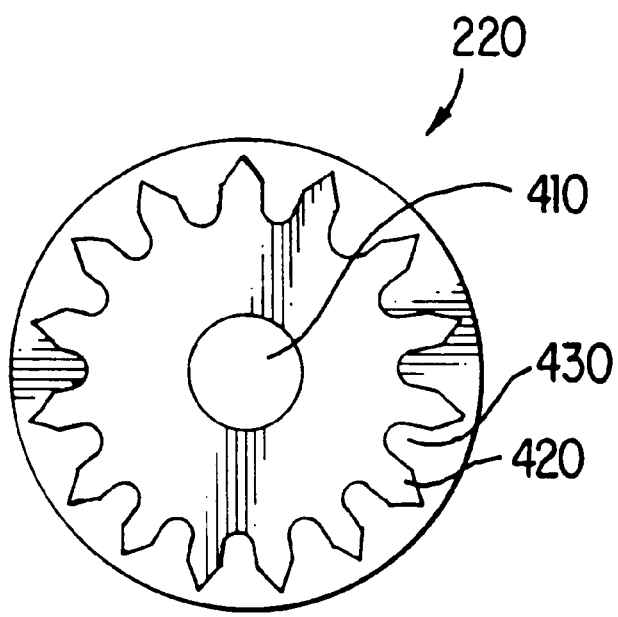

FIGS. 4 and 5 show side views of a braking surface 220 in a preferable configuration, i.e., as a cog wheel 220. The cog wheel 220 may be formed of any appropriate resilient material, such as plastic (e.g., Nylon 66). The cog wheel 220 is generally circular in shape and defines a through hole 410 to receive the axle. On a side facing toward the brake member 210, the cog wheel 220 includes extensions 420 and gaps 430. According to a preferred embodiment, the extensions 420 are arrowhead shaped, as shown in FIGS. 4 and 5. As will be explained, the projection 212 of the brake member 210 is received into a gap 430 to engage a respective extension 420, thereby locking the cog wheel 220 and the wheel 116.

Figure 6A:
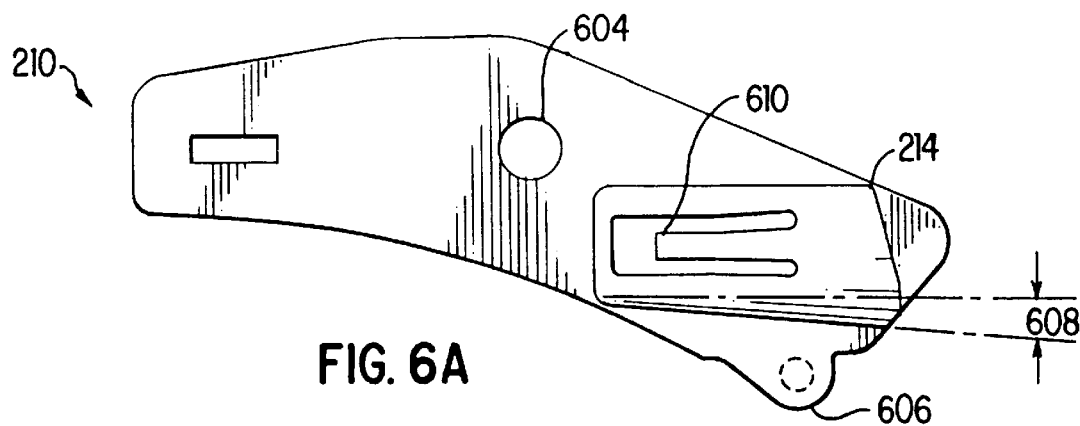
FIGS. 6A through 6C are respectively side, top, and rear views of a brake member for the brake assembly of FIG. 2.
Figure 6B:
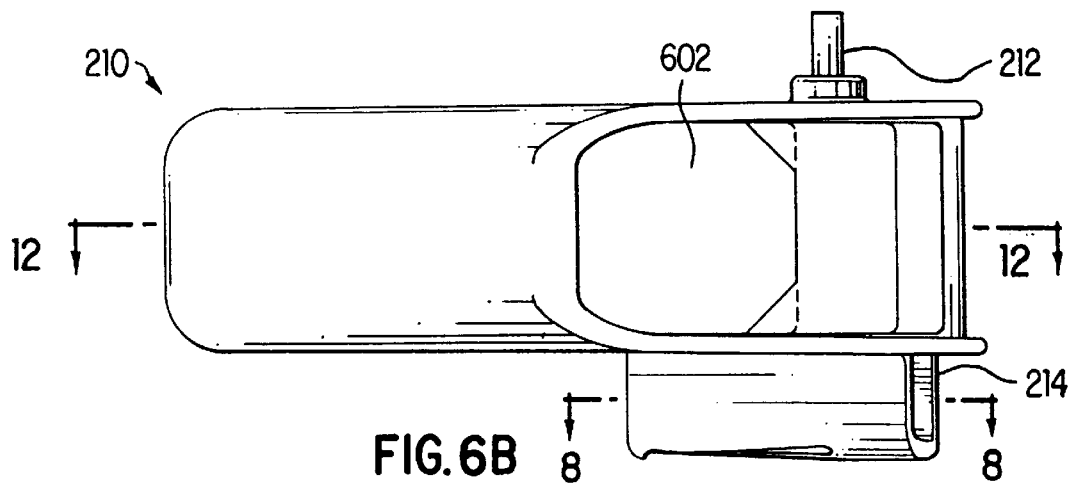
Figure 6C:
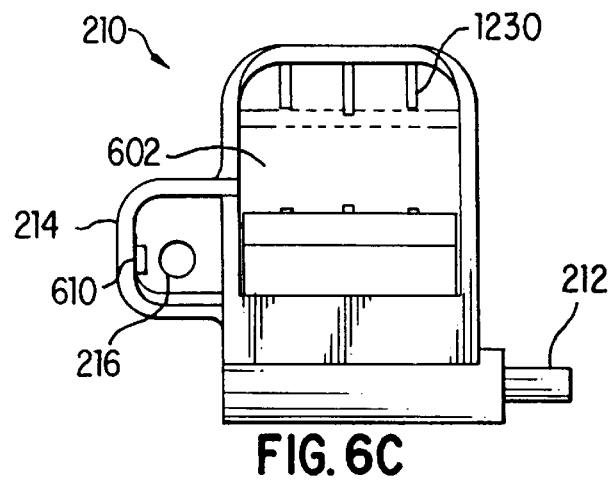

FIGS. 6A through 6C show the brake member 210 for the right brake according to a preferred embodiment of the present invention. The body of the brake member 210 may be formed of any resilient material, such as plastic (e.g., Nylon 66). Here, the body of the brake member 210 is generally hollow defining a central aperture 602. The central aperture 602 enables the brake member to be fit over the mounting member 240 and to pass the vertical support of the frame 112 as shown in FIGS. 2 and 3. The brake member 210 also defines a pivot hole 604 so that it can be pivotally mounted onto the mounting member 240.

Further, the projection 212 is located on an end portion 606 of the brake member 210. Hence, when the brake member 210 pivots, the projection 212 moves to engage the cog wheel 220. Preferably, the projection 212 is formed of a durable and strong material, such as aluminum or steel.

The lever receiving portion 214 includes a cavity 216 for receiving the actuation lever 230. According to the present invention, the actuation lever 230 is not fixedly received by the lever receiving portion 214 but a preferred degree of motion is provided. This may be accomplished, for example, by forming upper and lower walls of the cavity 216 at an angle 608 other than parallel, thereby creating a clearance space to allow motion of the actuation lever 230 in the cavity 216. Accordingly, the lever receiving portion 214 further includes retaining means to retain the actuation lever 230 in a preferred embodiment. For example, the retaining means may be configured as a flexible tab 610 which engages an indent, hole, or the like formed in the inserted end of the actuation lever 230.

Figure 7A:
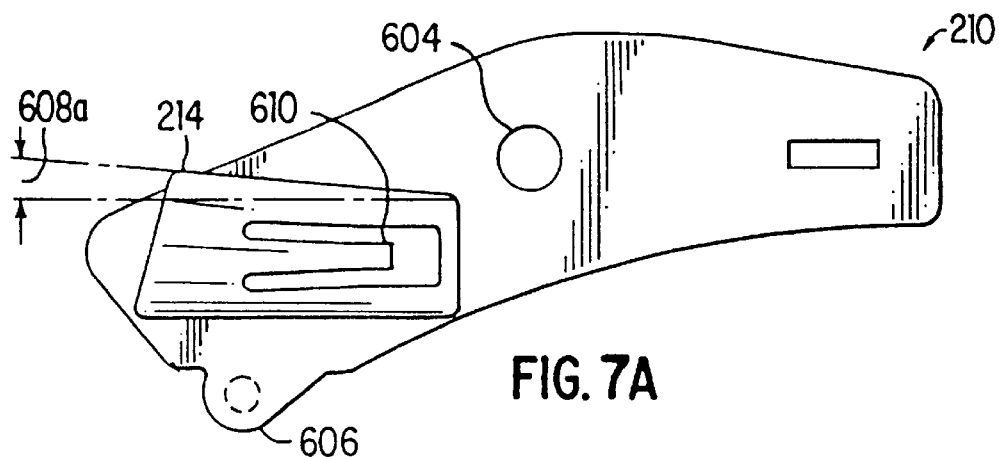
FIGS. 7A through 7C are respectively side, top, and rear views of a brake member for a brake on the left side of the stroller.
Figure 7B:
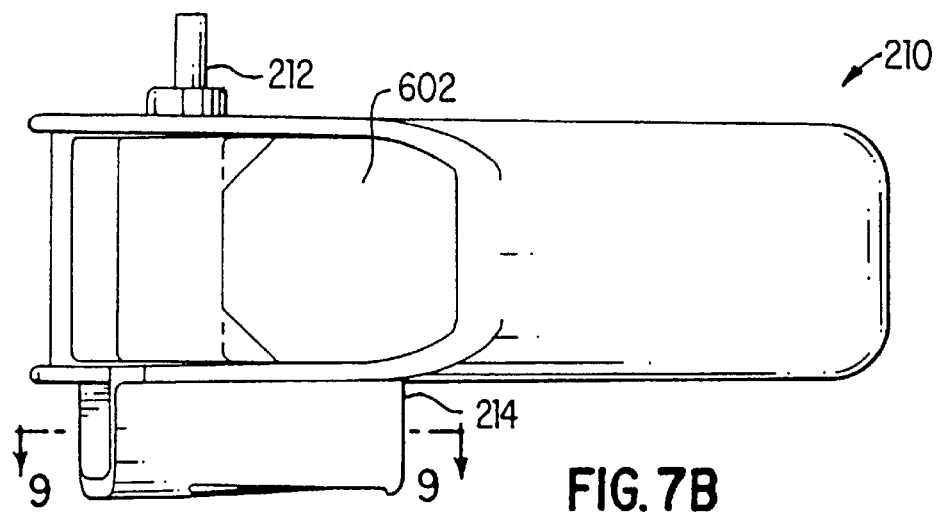
Figure 7C:
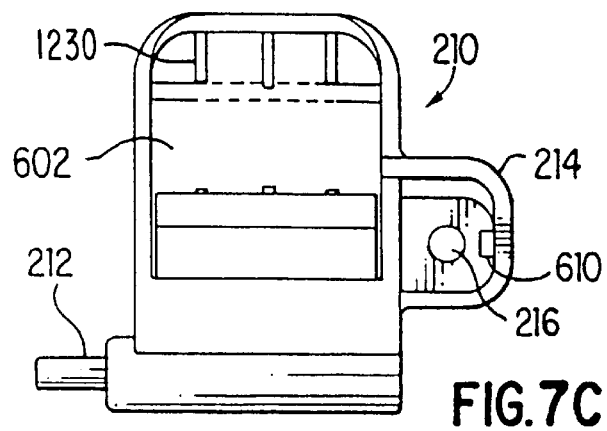
Figure 8:
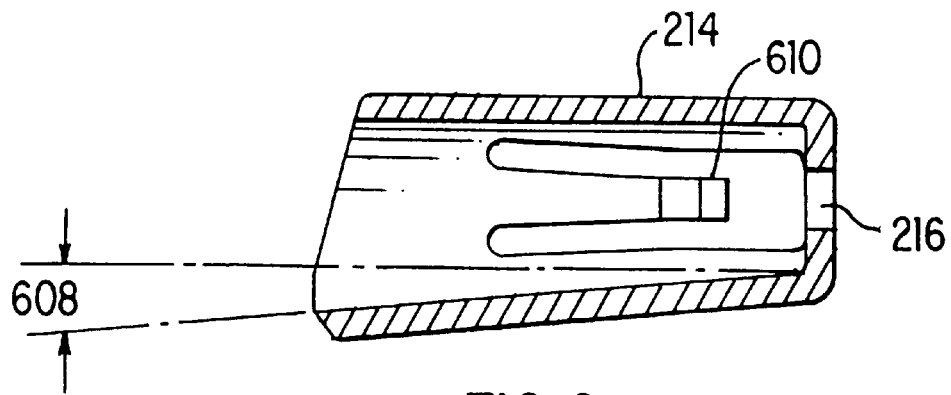
FIG. 8 is a cross-sectional view of the right brake member along line 8—8 of FIG. 6B.
Figure 9:
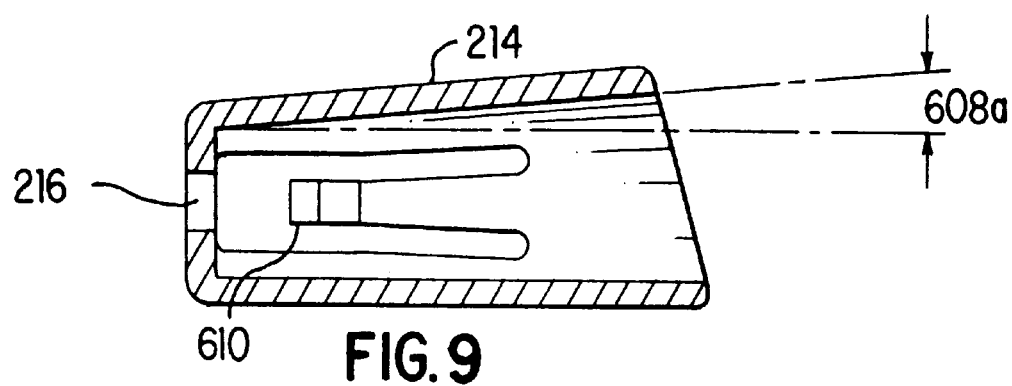
FIG. 9 is a cross-sectional view of the left brake member along line 9—9 of FIG. 7B.
Figure 10A:
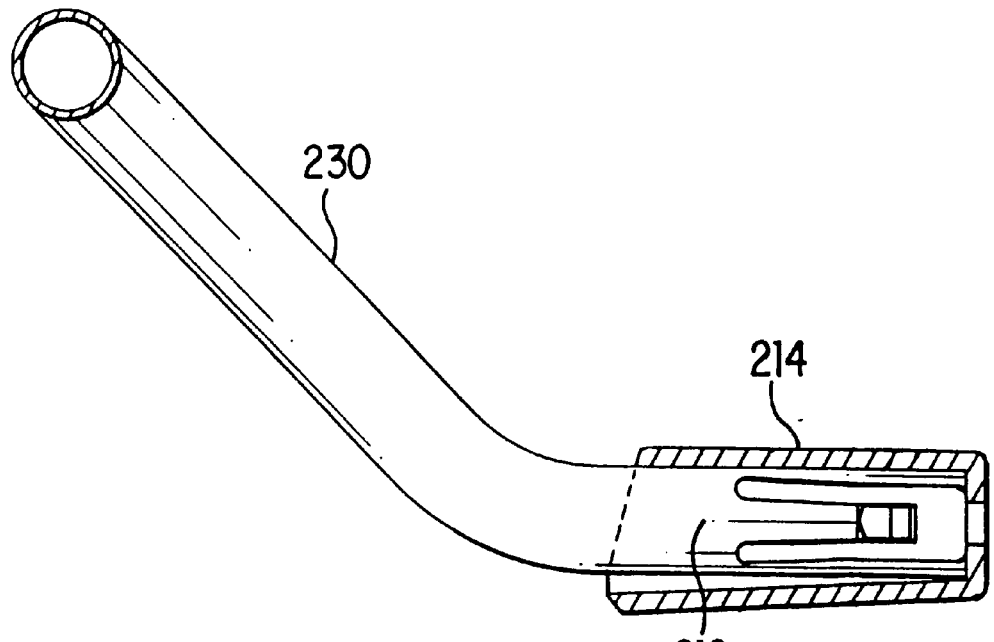
FIGS. 10A and 10B are views of the actuation lever for the brake assembly according to the present invention.

FIGS. 7A through 7C show a left brake member 210 corresponding to the right brake member of FIGS. 6A through 6C. As shown, the left brake member 210 is generally symmetric to the left brake member 210. However, the clearance angle 608a of the right brake member 210 is formed oppositely as compared to clearance angle 608 of the right brake member 210, thereby allowing motion of the actuation lever 230 oppositely at the two brake members 210. This is further shown in the cross-sectional views of FIG. 8 (left brake) and FIG. 9 (left brake). While the figures have presented the clearance angle 608 of the right brake member 210 formed at a lower side and the clearance angle 608a of the left brake member 210 formed at an upper side, the opposite configuration would be substantially equivalent. The clearance angles 608 and 608a are preferably the same magnitude, for example, 5 degrees. Of course, the clearance angles 608 and 608*a* can also have different magnitudes. FIG. 10A shows the actuation lever 230 inserted into the cavity 216.

Figure 10B:
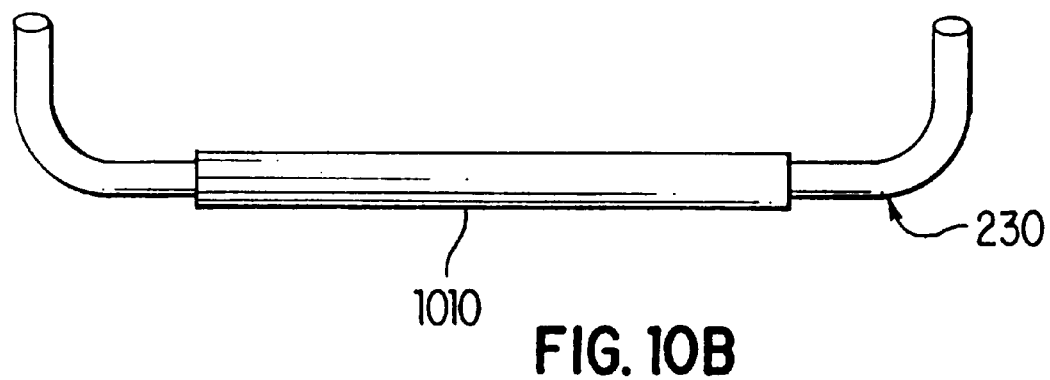

FIG. 10B shows the actuation lever 230. While any desired material may be used, the actuation lever 230 may be formed of tubular steel or aluminum. Because the actuation lever 230 in the preferred embodiment is operated by the user's foot, an anti-scuff material 1010, for example polypropylene, may be applied to the surface of the actuation lever 230.

Figure 11A:
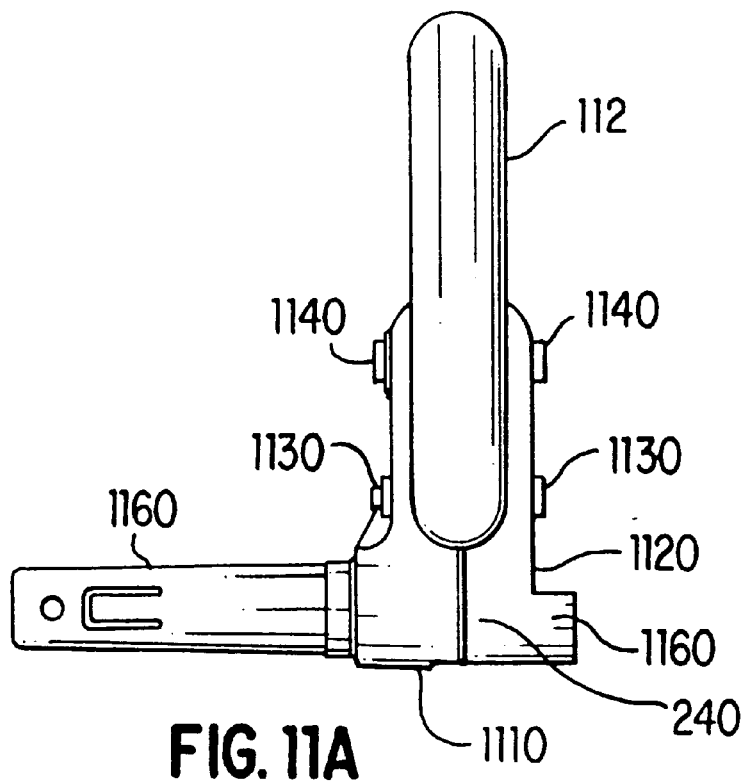
FIGS. 11A and 11B are respectively rear and side views of a mounting member for the brake assembly of FIG. 2.
Figure 11B:
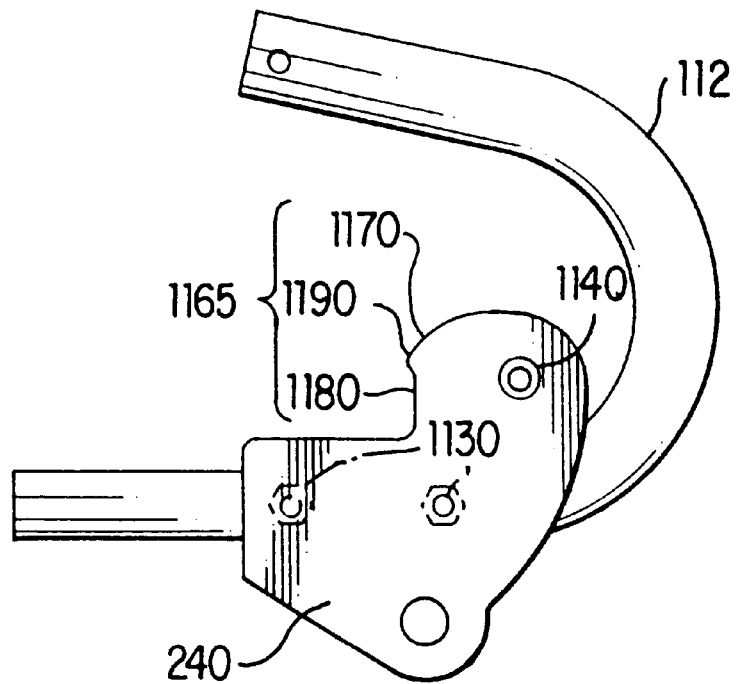

FIGS. 11A and 11B respectively show rear and side views of the mounting member 240. The mounting member 240 may be formed of any resilient material, such as plastic (e.g., Nylon 66). The mounting member 240 is fixed to the frame 112, and in an exemplary embodiment, the mounting member 240 may comprise an inner portion 1110 and outer portion 1120 which are fastened to the frame using fastening means 1130 such as bolts, rivets, or the like. The mounting member 240 includes pivots 1140 formed on opposite sides of the mounting member 240 to be received by the pivot holes 604 of the brake member 210 so that the brake member 210 may be pivotally mounted to the mounting member 240. While not shown, the pivots 1140 may have a sloped top so that the brake member 210 can be slidably mounted onto the mounting member 240, thereby facilitating assembly. Also, the mounting member 240 may include axle/wheel mounts 1160. Preferably, the axle/wheel mount 1160 is of the type described in U.S. patent application Ser. No. 08/738,234 entitled "Axle and Wheel Mount Assembly" to Hartenstine et al. filed on Oct. 25, 1996, which is hereby incorporated by reference.

According to a preferred embodiment, the mounting member 240 also includes a cam surface 1165 having a first cam surface portion 1170 and a second cam surface 1180. The first and second cam surfaces 1170 and 1180 form a crest 1190 at the interface.

Figure 12:
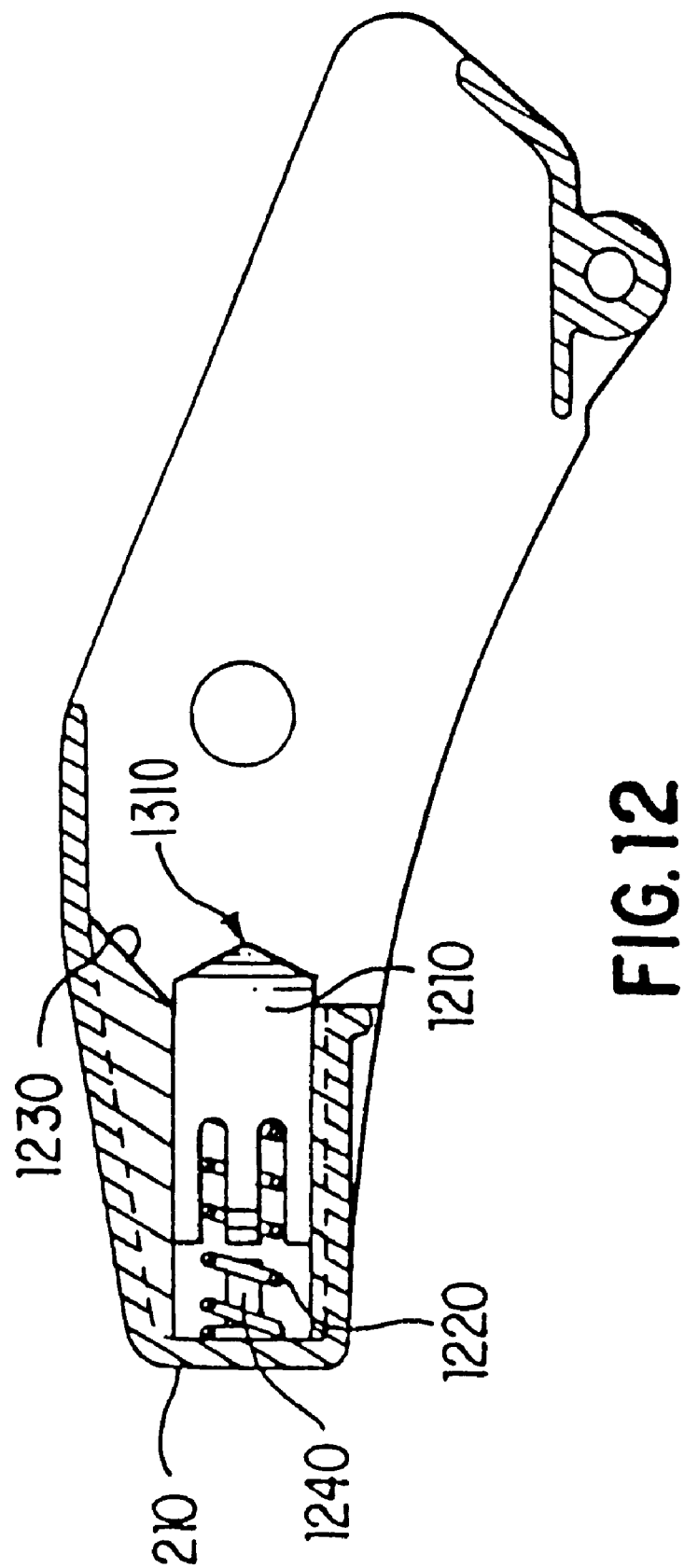
FIG. 12 is a cross sectional view of the brake member across line 12—12 of FIG. 6B.

FIG. 12 is a cross-sectional view of the brake member 210 showing a cam follower 1210. The cam follower 1210 is disposed in the aperture of the brake member 210 and biased by a compression spring 1220 toward the right in FIG. 12, so that the cam follower 1210 can bear against the cam surface 1165. To guide motion of the cam follower 1210, a guide path may be defined by internal walls of the brake member 210. To minimize weight, the internal walls of the brake member 210 are constructed having ribs 1230. (See also FIGS. 6C and 7C.) The brake member 210 may also include a projection 1240 which receives the spring 1220 along its axis.

Figure 13A:
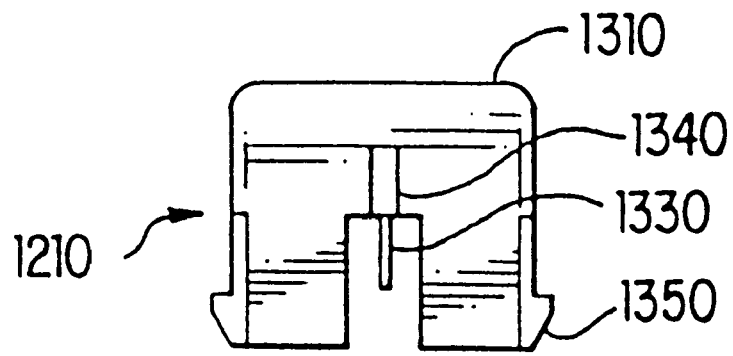
FIGS. 13A through 13C are respectively top, side, and rear views of a cam follower for the brake assembly of FIG. 2.
Figure 13B:
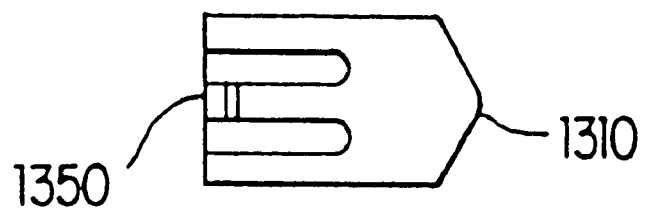
Figure 13C:
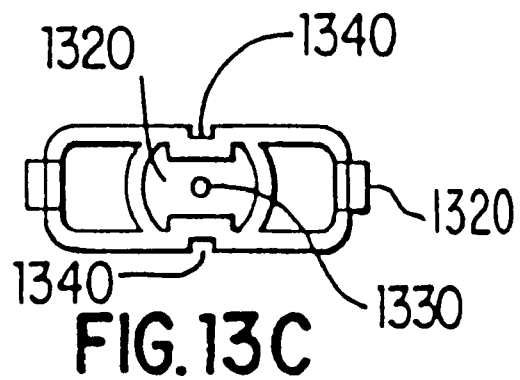

FIGS. 13A through 13C respectively show top, side, and rear views of the cam follower 1210. The cam follower 1210 may be constructed of any resilient material such as plastic (e.g., Celcon M90). The cam follower 1210 includes an engaging surface 1310 for engaging the cam surface 1165 of the mounting member 240. In a preferred embodiment, a socket 1320 and a protrusion 1330 are formed in the interior of the cam follower 1210 to retain the spring 1220. The motion of the cam follower 1210 may be further guided by grooves 1340 which receive the ribs 1230 and by the tabs 1350 which are received by slots 1410 formed in the brake member 210, as shown in FIGS. 14A and 14B.

Figure 14A:
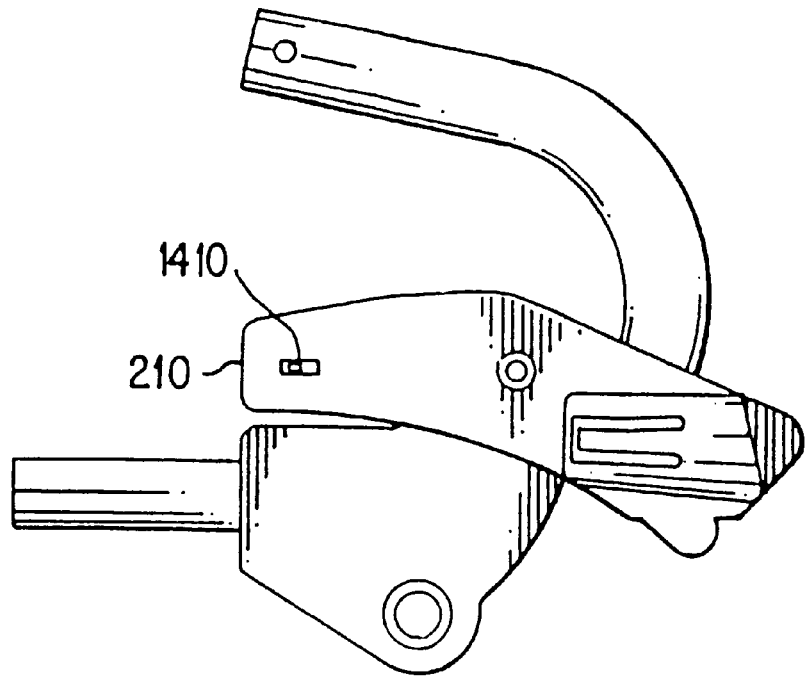
FIGS. 14A and 14B are side views of the brake assembly of FIG. 2 showing the operation of the brake member.
Figure 14B:
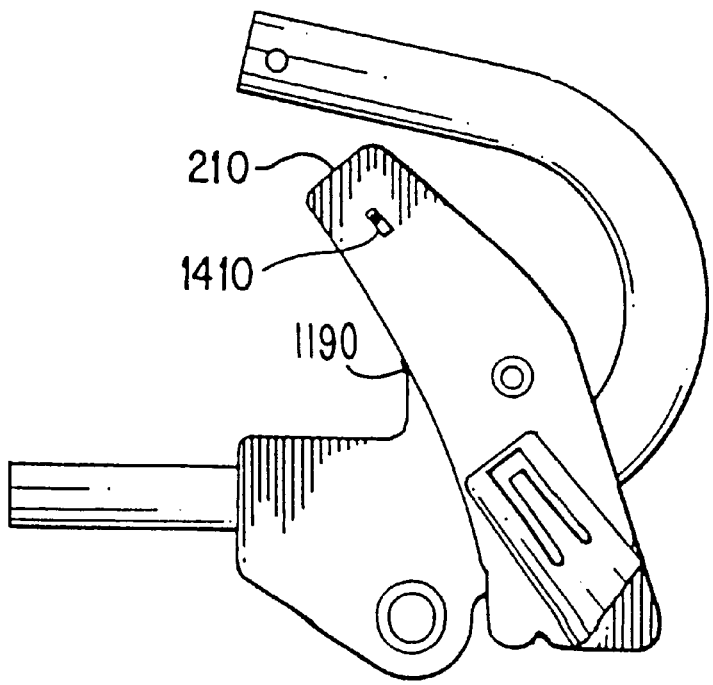
Figure 15A:
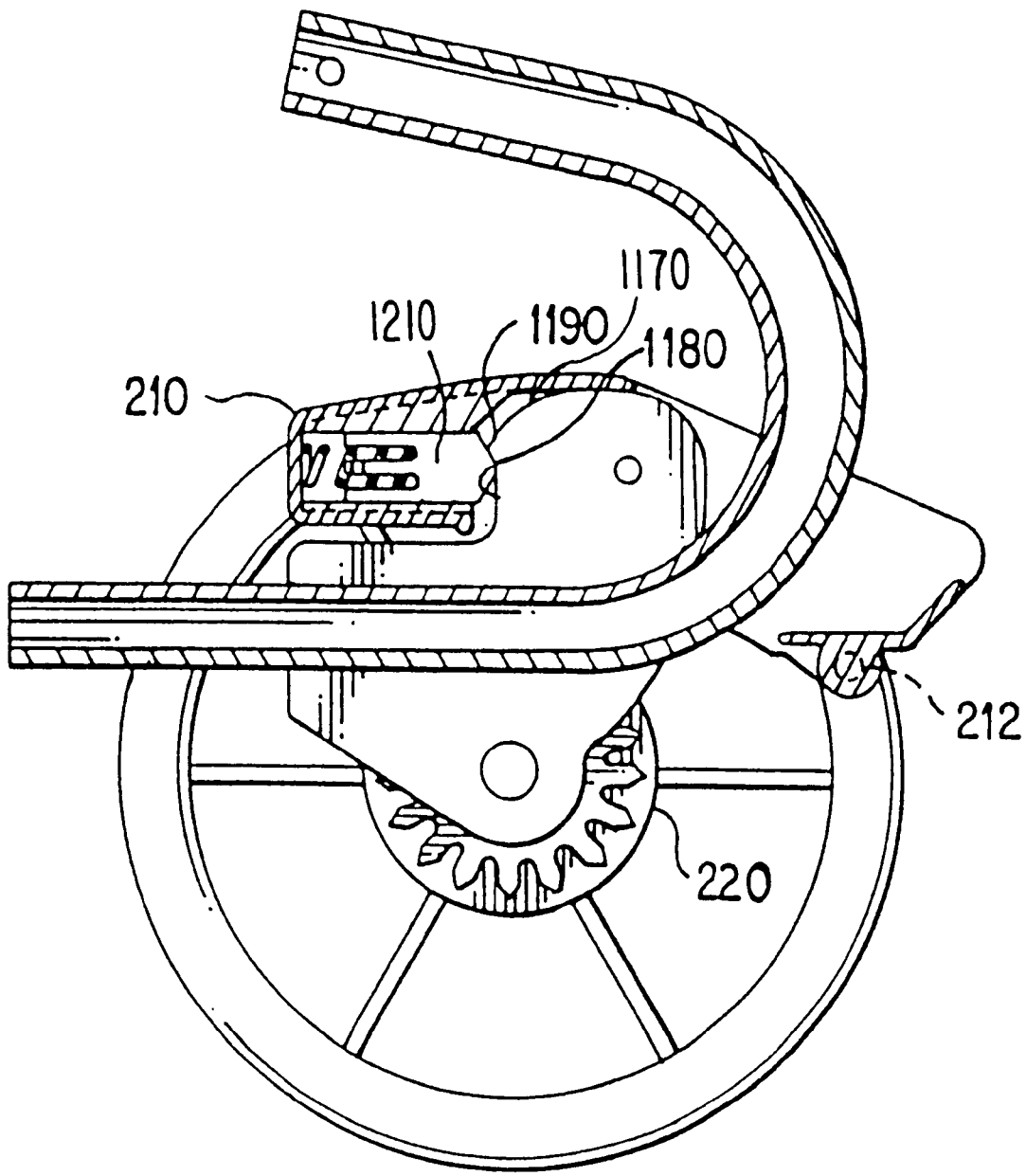
FIGS. 15A and 15B are cross-sectional views of the brake assembly of FIG. 2 showing the operation of the brake member and the cam follower.
Figure 15B:
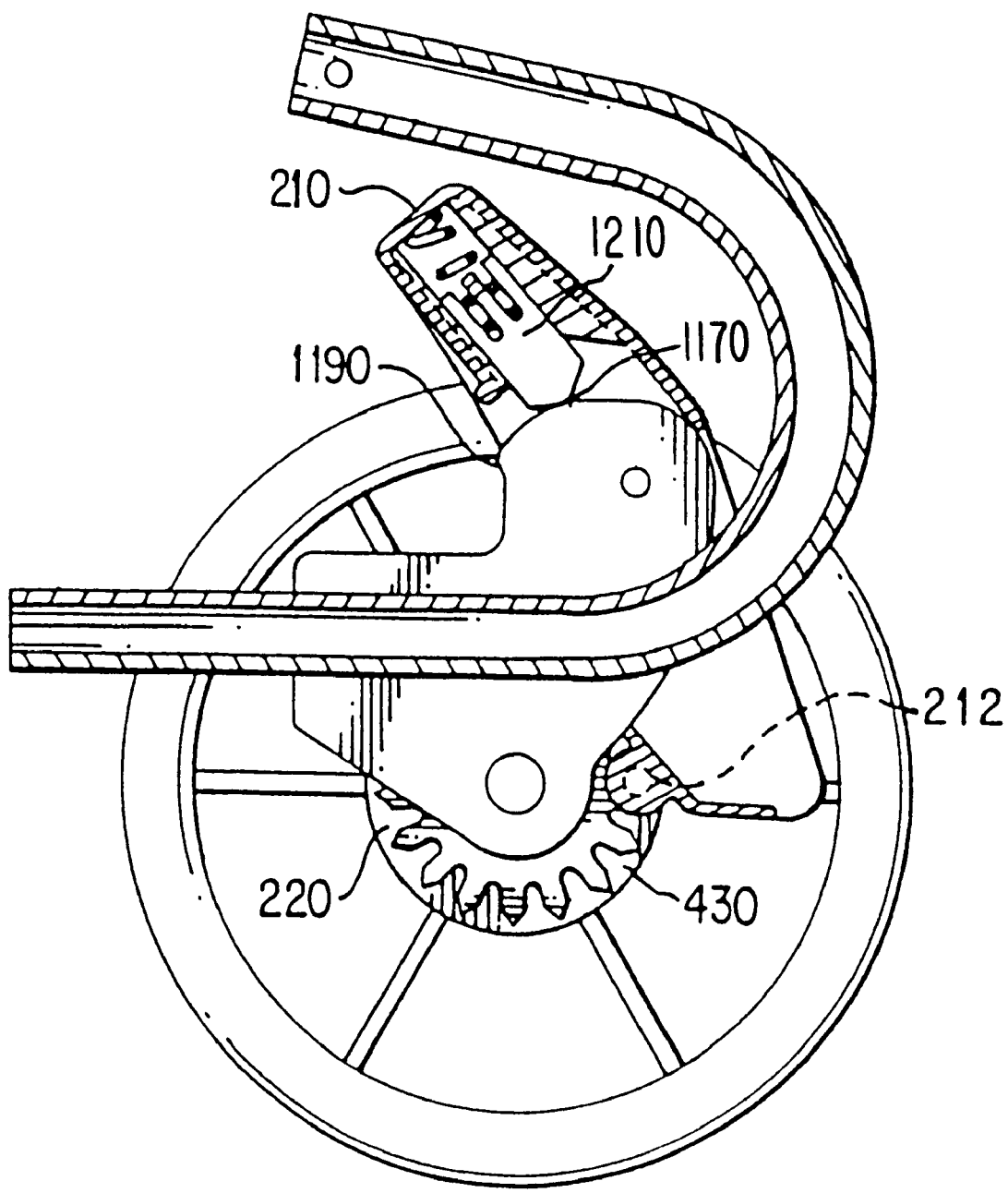

FIGS. 14A, 14B, 15A, and 15B show the operation of the brake assembly in accordance with a preferred embodiment of the present invention. Specifically, FIGS. 14A and 15A show the brake 120 in an unlocked state, and FIGS. 14B and 15B show the brake 120 in a locked state. As previously described, the brake member 210 may be pivoted between the locked and unlocked states.

Referring to FIG. 15A, the projection 212 is disengaged from the cog wheel 220 in the unlocked state. Further, the cam follower 1210 is in pressure contact with the second cam surface 1180 of the mounting member 240. Here, the pressure between the cam follower 1210 and the second cam surface 1180 causes the brake member 210 to be biased to the unlocked state as a result of the relative inclination of the second cam surface 1180.

As shown in FIG. 15B, the projection 212 is engaged with the cog wheel 220 in the locked state. Specifically, the projection 212 is received into a gap 430 of the cog wheel 220. Further, the cam follower 1210 is in pressure contact with the first cam surface 1170 of the mounting member 240. Here, the pressure between the cam follower 1210 and the first cam surface 1170 cause the brake member 210 to be biased to the locked state as a result of the relative inclination of the first cam surface 1170.

As can be seen, when the cam follower 1210 moves over the crest 1190, the rotational bias of the brake member 210 switches between a counter clockwise bias in the unlocked state and a clockwise bias in the locked state (as shown in FIG. 15). Therefore, ergonomic operation of the brake assembly is achieved with positive biasing to retain the brake assembly in which ever of the engaged and disengaged states desired by the user.

To lock the preferred brake assembly of the present invention as described, the user depresses the actuation lever 230 with the foot. This causes each brake member 210 to pivot in a direction to lower the projection 212 into engagement with the cog wheel 220. That is, the projection 212 is received into a gap 430 so that it engages the adjacent extensions 420. The wheel 116 of the stroller, which is operatively connected with the cog wheel, is then locked.

To unlock the brake assembly of the present invention as described, the user lifts the actuation lever 230 with the foot. This causes each brake member 210 to pivot in a direction to raise the projection 212 is raised out of the gap 430. In this manner, the projection 212 no longer engages the extensions 420, and the wheel 116 is in an unlocked state.

Figure 16A:
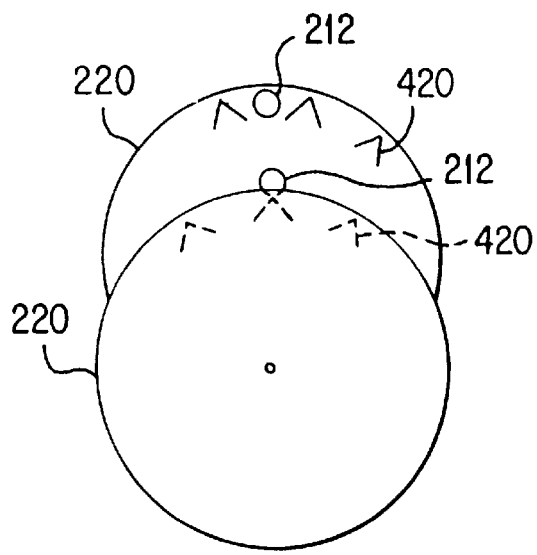
FIGS. 16A through 16C are schematic views of the improved engagement of the cog wheels in accordance with the present invention.
Figure 16B:
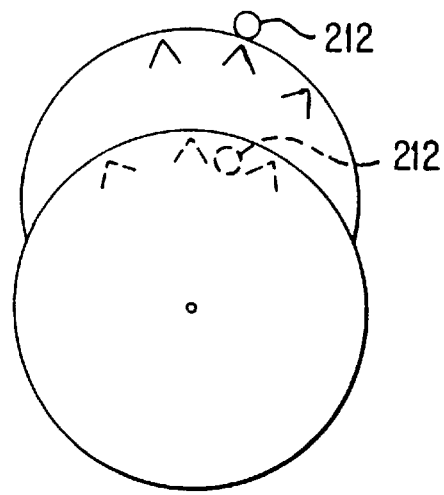

According to a preferred embodiment of the present invention, the brake member 210 can more positively engage the cog wheel 220 as compared to some conventional strollers. Referring to FIGS. 16A and 16B, if one projection 212 is positioned at an extension 420 while the other projection is positioned at a gap 430, the projection at the gap 430 is received into the gap 430, thereby engaging the cog wheel 220. Meanwhile, the remaining projection 212 rests on the extension 420 until the cog wheel 220 rotates so that an adjacent gap 430 is properly positioned.

Figure 17:
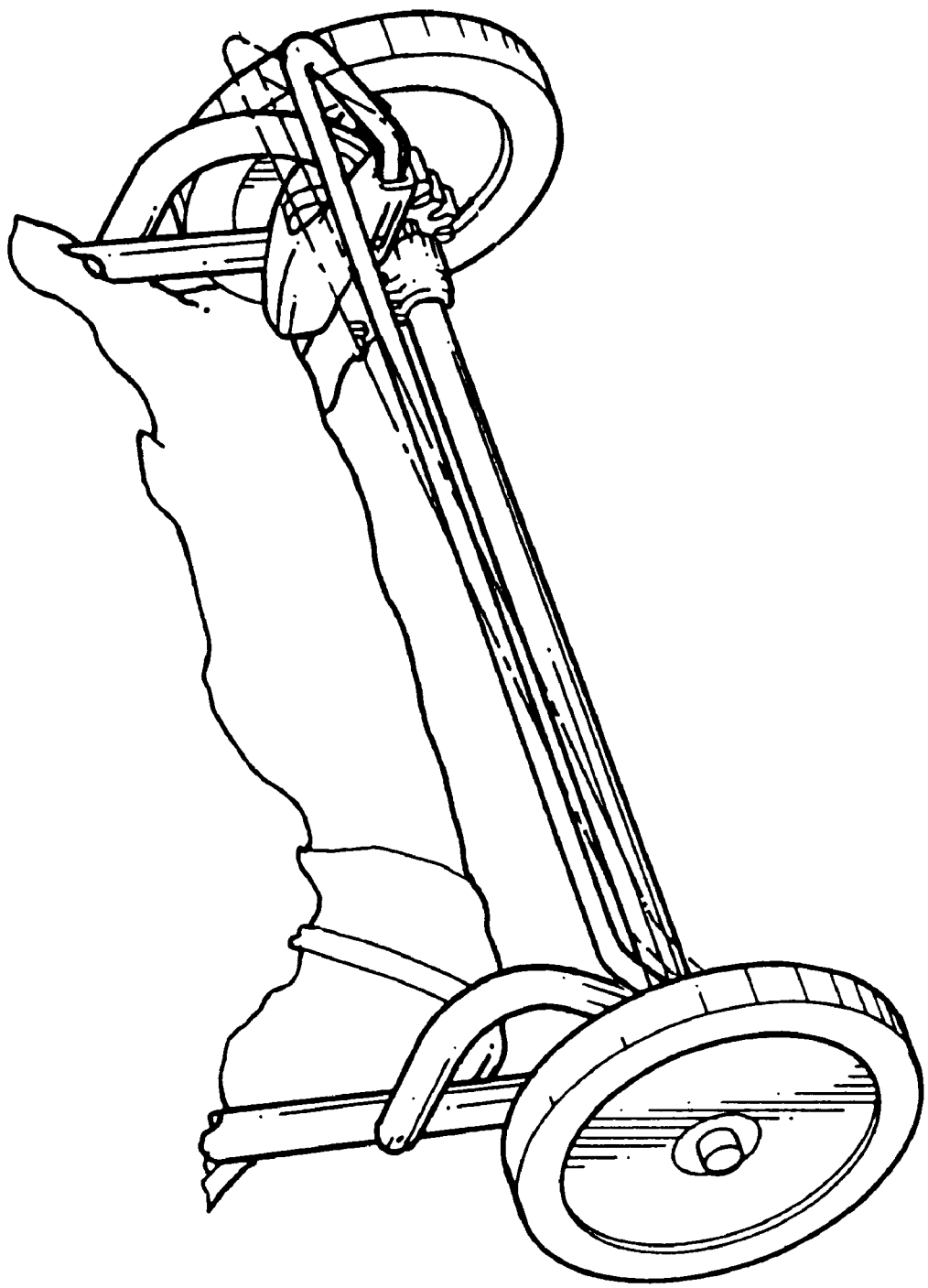
FIG. 17 is a perspective view of the brake assembly showing the decoupling of the right and left brakes in accordance with the present invention.

That is, as shown in FIGS. 16A and 16B, an initial misalignment of the cog wheels 220 may occur so that a gap 430 positionally aligns with an extension 420. Then, the user actuates the brake assembly using the actuation lever 230 so that one projection 212 hits an extension 420 while the other projection 212 is received into a gap 430. Accordingly, the one projection 212 received into the gap 430 locks the corresponding wheel 116. Therefore, the actuation lever 230 is somewhat "twisted" as shown in FIG. 17. However, a slight movement of the second wheel 116 will align the projection 212 with an adjacent gap 430. Then, the remaining projection 212 will be received into the gap 430, thereby engaging the cog wheel 220. Thus, both brakes 120 of the stroller will be locked.

Figure 16C:
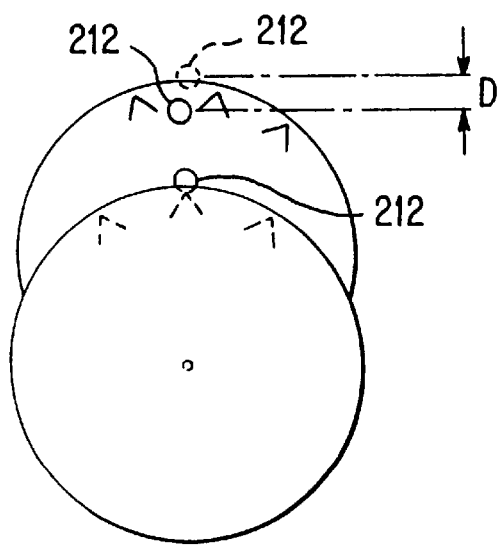

In this manner, the "skip" of the conventional brake is prevented. In accordance with a preferred embodiment, one projection 212 can engage because the two brakes 120 are not rigidly coupled by the actuation lever 230. Here, the clearance angles 608 and 608a provided in the cavities 216 of the lever receiving portion 214 of the brake member 210 allow decoupling of the brakes while retaining simultaneous user actuation of both brakes 120. Specifically, the sum of the clearance angles 608 and 608a should allow a decoupling that corresponds to a distance D in the movement of one of the projections 212, as indicated in FIG. 16C. Furthermore, because the clearance angles 608 and 608a of the right and left brakes were formed oppositely, the additional freedom of motion add together to maximize the distance D for a given clearance angle. Moreover, the clearance angle should not be too large to retain responsiveness when actuating the brake assembly. Hence, in many applications, it is preferable to provide a clearance angle on only one side of the lever receiving portion 214 of each brake member 210. FIG. 17 further shows the decoupling between the two brakes when one projection 212 is positioned at a extension 420 while the other projection is positioned at a gap 430.

Figure 18:
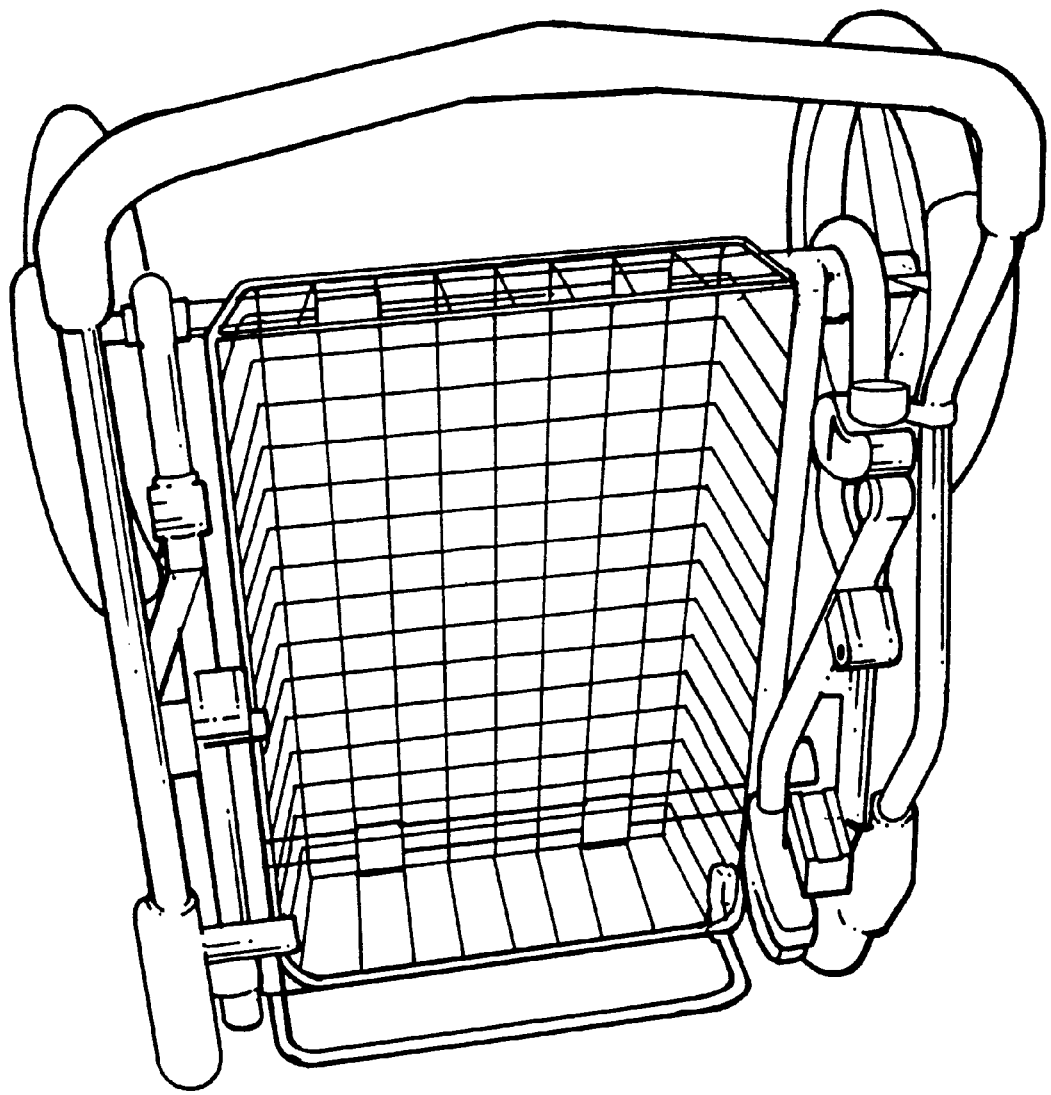
FIG. 18 is a perspective view of a collapsed stroller using the brake assembly as a stand in accordance with the present invention.

In a preferred embodiment, the actuation lever 230 can be used as a stand when the stroller is collapsed. As shown in FIG. 18, a collapsed stroller is stably positioned in an upright position using the actuation lever 230 in combination with the wheels. Of course, the actuation lever 230 should be in the upward, unlocked position to properly utilize this feature of the present invention. Here, the actuation lever 230 provides a non-rolling structure for balancing the collapsed stroller. In the preferred embodiment, the actuation lever 230 extends upwards from the lever receiving portion 214 of the brake member at about at 45° angle (with respect to the plane containing the stroller wheels) as shown in FIG. 10A.

It will be apparent to those skilled in the art that various modifications and variations can be made in the stroller of the present invention without departing from the spirit or scope of the invention. Thus, it is intended that the present invention cover the modifications and variations of this inventions provided they come within the scope of the appended claims and their equivalents.

What is claimed is:

1. A stroller having a frame and a plurality of wheels, comprising:
   a mounting member fixedly disposed on the frame, the mounting member having a fixed cam surface with a first cam portion and a second cam portion;
   a brake member pivotally connected to the mounting member and pivotally movable between a locked position and an unlocked position;
   a movable cam follower disposed in the brake member and pressed against the fixed cam surface, the first cam portion biasing the brake member toward the locked position when the movable cam follower contacts the first cam portion and the second cam portion biasing the brake member toward the unlocked position when the movable cam follower contacts the second cam portion; and
   a brake surface operatively connected to the wheel, the brake member having an engaging portion engaging the brake surface when the brake member is in the locked position.

2. The stroller according to claim 1, wherein the mounting member includes a first portion and a second portion fastened on the frame.

3. The stroller according to claim 1, wherein the cam surface further includes a crest at the interface of the first cam portion and the second cam portion.

4. The stroller according to claim 1, further comprising a spring to maintain the pressure contact between the cam follower and the cam surface.

5. The stroller according to claim 1, wherein the brake member defines a recess.

6. The stroller according to claim 5, wherein the cam follower is disposed in the recess of the brake member.

7. The stroller according to claim 6, further comprising a spring disposed in the recess to maintain the pressure contact between the cam follower and the cam surface.

8. The stroller according to claim 6, wherein the recess receives an upper portion of the mounting member.

9. The stroller according to claim 1, wherein the braking surface includes a cog wheel.

10. The stroller according to claim 9, wherein the cog wheel includes extensions and gaps around a peripheral portion.

11. The stroller according to claim 10, wherein the extensions are arrowhead shaped.

12. A stroller having a frame, a first wheel and a second wheel, comprising:
    a first brake member pivotally mounted on the frame, the first brake member pivotally movable between a locked position and an unlocked position;
    a second brake member pivotally mounted on the frame, the second brake member pivotally movable between a locked position and an unlocked position;
    a first cog wheel operatively connected to the first wheel;
    a second cog wheel operatively connected to the second wheel;
    a first projection fixedly disposed on the first brake member to engage the first cog wheel when the first brake mechanism is disposed in the locked position;
    a second projection fixedly disposed on the second brake mechanism to engage the second cog wheel when the second brake mechanism is disposed in the locked position; and
    a brake actuation lever connected to the first and second brake members to actuate the first and second brake members together and allow at least one of the first and second projections to engage the respective cog wheel.

13. The stroller according to claim 12, wherein the first and second brake members each define cavities for receiving respective ends of the actuation lever.

14. The stroller assembly according to claim 13, wherein the each one of the cavities of the first and second brake members each define a clearance angle for allowing movement of the respective ends of the actuation lever received into the cavities.

15. The stroller according to claim 14, wherein the clearance angles of the first and second brake members are formed oppositely.

16. The stroller according to claim 15, wherein each clearance angle is about 5 degrees.

17. The stroller according to claim 13, wherein the one of the cavities of the first and second brake members defines a clearance angle for allowing movement of the respective end of the actuation lever received into the one of the cavities.

18. The stroller according to claim 13, wherein the first and the second brake members further include means for retaining the respective ends of the actuation lever in the respective cavities.

19. The stroller according to claim 12, further comprising first and second mounting members fixed to the frame, the first and second brake members being respectively pivotally mounted to the first and second mounting members.

20. The stroller according to claim 19, wherein at least the first mounting member includes a fixed cam surface having a first cam portion and a second cam portion, and wherein the first brake member includes a movable cam follower to maintain pressure contact with the cam surface, the brake member being biased toward the locked position when the cam follower contacts the first cam portion and being biased toward the unlocked position when the cam follower contacts the second cam portion.

21. The brake assembly according to claim 12, wherein the first and the second cog wheels each include extensions and gaps, the gaps of the respective cog wheels receiving the respective projections to engage the projections between adjacent pairs of respective extensions.

22. The stroller according to claim 21, wherein the gaps define a gap depth, the decoupling of the first and second brake members corresponding to a movement of one of the projections by a displacement of at least the gap depth.

23. The stroller according to claim 21, wherein the extensions are arrowhead shaped.

24. The stroller according to claim 12, wherein the stroller is collapsible and the actuation lever functions as a stand.

25. A stroller having a frame, a first wheel and a second wheel, comprising:

a first brake member mounted on the frame, the first brake member movable between a locked position and an unlocked position, the first brake member having a first cavity;

a second brake member mounted on the frame, the second brake member movable between a locked position and an unlocked position, the second brake member having a second cavity;

a first cog wheel operatively connected to the first wheel;

a second cog wheel operatively connected to the second wheel;

a first projection disposed on the first brake member to engage the first cog wheel when the first brake mechanism is disposed in the locked position;

a second projection disposed on the second brake mechanism to engage the second cog wheel when the second brake mechanism is disposed in the locked position; and an actuation lever having respective ends inserted into the first and second cavities to connect the first and second brake members, wherein the actuator lever simultaneously actuates the first and second brake members, wherein the first and second cavities have oppositely formed clearance angles that allow the respective ends of the actuation lever to move independently and allow at least one of the first and second projections to engage the respective cog wheel.

* * * * *

UNITED STATES PATENT AND TRADEMARK OFFICE
CERTIFICATE OF CORRECTION

PATENT NO. : 6,022,042
DATED : February 8, 2000
INVENTOR(S) : Curtis M. HARTEINSTEIN It is certified that error appears in the above-identified patent and that said Letters Patent is hereby corrected as shown below:

Please correct the following:

Sheet 11, Figure 13C, correct "1320" (left side) to --1350--;

Sheet 12, Figure 14B, correct "1190" to --1180--.

Signed and Sealed this

Twenty-seventh Day of March, 2001

Attest:

NICHOLAS P. GODICI

*Attesting Officer*   *Acting Director of the United States Patent and Trademark Office*